United States Patent [19]

Dove et al.

[11] Patent Number: 5,076,530
[45] Date of Patent: Dec. 31, 1991

[54] SEAT ADJUSTER WITH INTERLOCKING TRACKS

[75] Inventors: Allen D. Dove; Roger L. Brock, both of Roscoe; Billy L. Larson, Rockford, all of Ill.

[73] Assignee: Atwood Industries, Inc., Rockford, Ill.

[21] Appl. No.: 691,735

[22] Filed: Apr. 26, 1991

[51] Int. Cl.⁵ .............................................. B60N 1/00
[52] U.S. Cl. .................................... 248/430; 248/420; 384/34
[58] Field of Search ............... 248/430, 429, 419, 420; 297/346, 329, 318; 384/18, 19, 34, 50

[56] References Cited

U.S. PATENT DOCUMENTS

| | | |
|---|---|---|
| 2,336,433 | 12/1943 | Woina .................. 248/430 |
| 3,491,979 | 1/1970 | Wonell .................. 248/430 |
| 4,742,983 | 5/1988 | Nihei .................... 248/429 |
| 4,760,988 | 8/1988 | Bianchi et al. ........ 248/420 X |
| 4,852,846 | 8/1989 | Weier ................... 248/430 |

FOREIGN PATENT DOCUMENTS 661612 11/1951 United Kingdom ............... 248/430
942976 11/1963 United Kingdom ............... 248/429

Primary Examiner—Karen J. Chotkowski
Attorney, Agent, or Firm—Leydig, Voit & Mayer

[57] ABSTRACT

A track assembly of a vehicle seat adjuster includes an upper track secured to the seat and adjustable back and forth along a lower track which is anchored to the vehicle floor pan. Friction between the tracks is reduced by load-bearing rollers located between the tracks at the center thereof and by spherical balls located between the tracks along the sides thereof. The rollers travel independently of the balls to prevent possible binding of the rollers, the balls along each side of the track being held in fixed longitudinally spaced relation by a strip-like retainer. The balls are positioned at the lower corners of the upper track and, if the vehicle is involved in a severe frontal crash, the balls cause portions of the upper track to be forcibly pinched between portions of the lower track so as to effect interlocking of the tracks and thereby reduce the danger of the upper track moving forwardly relative to and separating vertically from the lower track under the influence of seat belt loads imposed on the upper track.

11 Claims, 2 Drawing Sheets

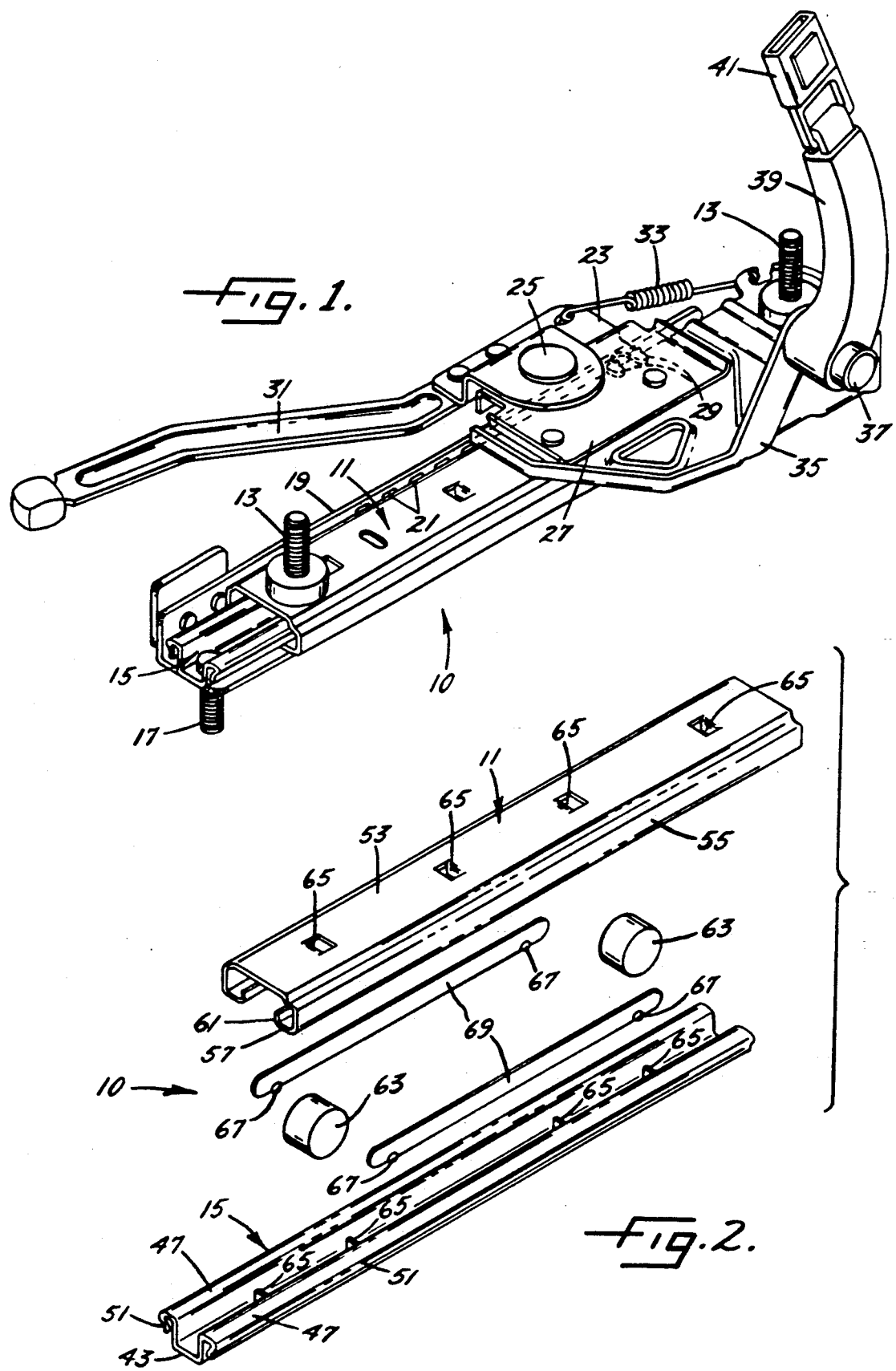

SEAT ADJUSTER WITH INTERLOCKING TRACKS

BACKGROUND OF THE INVENTION

This invention relates to a seat adjuster or track assembly for supporting a vehicle seat for selective back and forth adjustment in the passenger compartment of the vehicle.

Typically, the front seat of the vehicle is supported by two adjustable track assemblies, there being one track assembly beneath the seat along each side thereof. Each assembly comprises an upper track secured to the lower side of the seat and supported on a lower track to move back and forth in the passenger compartment. The lower track is anchored to the floor pan of the vehicle. A latch normally holds the upper track against movement relative to the lower track and may be selectively released to permit adjustment of the seat.

Conventionally, the lower track is in the form of an upwardly opening and generally U-shaped channel which is formed with outwardly projecting flanges at its upper end. The upper track is a channel in the shape of an inverted U and includes depending side walls which straddle the lower track. Inwardly projecting flanges are formed on the lower ends of the side walls of the upper track and are disposed in downwardly spaced opposing relation with the flanges of the lower track.

In order to enable the upper track to move along the lower track with relatively low friction, bearing assemblies are interposed between the two tracks. In a conventional track assembly, two bearing assemblies are located between the tracks and are spaced from one another along the tracks. Each bearing assembly comprises a retainer, a cylindrical roller located at the center of the retainer, and spherical balls located at opposite sides of the retainer. With such a bearing assembly, the roller supports the load of the seat and pushes upwardly on the upper track and downwardly on the lower track. The balls are located at the lower corners of the upper track and act against the opposing flanges of the tracks so as to push downwardly on the upper track and upwardly on the lower track. In this way, the balls take up vertical play between the two tracks and prevent the upper track from being loose in the upward direction.

For the most part, bearing assemblies of the foregoing type perform admirably. With the balls of the bearing assembly being located at the lower corners of the upper track, the balls break in quickly, exhibit low wear and do not experience detrimental brinelling. In some cases, however, variations in tolerances of the tracks, the retainers, the rollers and/or the balls cause the rollers to contact the retainers and interfere with smooth operation of the track assembly.

In modern seat adjusters, a seat belt anchor is attached to the upper track, usually by means of a bracket, and serves as an anchor point for the fixed strap of a seat belt. As a result of anchoring the fixed strap of the seat belt to the upper track, the seat belt adjusts back and forth with the seat so as to increase the comfort of the passenger. When a frontal crash occurs, however, the load imposed by the passenger against the seat belt is transmitted to the upper track and tends to move the upper track upwardly and forwardly relative to the lower track. The chances of passenger injury are increased if the upper track is permitted to move during a crash. Thus, the track assembly must be capable of sustaining heavier loads than is the case where the seat belt is anchored to a structure other than the track assembly.

SUMMARY OF THE INVENTION

One of the aims of the present invention is to provide a new and improved seat track assembly of the foregoing type in which the rollers are free of retainers and thus capable of unimpeded rolling while the balls remain located in the lower corners of the upper track so as to retain the advantages resulting from such location.

A further object of the invention is to provide a track assembly in which the upper and lower tracks are shaped in such a manner as to coact with the balls and interlock with one another in the event the vehicle is involved in a severe frontal crash and a heavy seat belt load is imposed on the upper track. By virtue of the tracks being interlocked by the action of the balls during a crash, the likelihood of the upper track separating vertically from and moving forwardly relative to the lower track is reduced.

The invention also resides in the provision of unique retainer strips for holding balls on each side of the track assembly in longitudinally spaced relation and for preventing such balls from moving toward or away from one another.

These and other objects and advantages of the invention will become more apparent from the following detailed description when taken in conjunction with the accompanying drawings.

BRIEF DESCRIPTION OF THE DRAWINGS

FIG. 1 is a perspective view showing a new and improved seat adjusting track assembly incorporating the unique features of the present invention.

FIG. 2 is an exploded perspective view of certain components of the track assembly.

DETAILED DESCRIPTION OF THE PREFERRED EMBODIMENT

Figure 3:
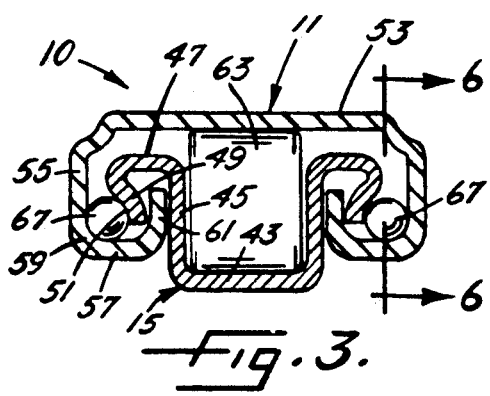
FIG. 3 is an enlarged cross-sectional view taken transversely through the track assembly and show the track assembly under normal conditions.

For purposes of illustration, the invention has been shown in the drawings as embodied in means for mounting a vehicle seat on the floor pan of the vehicle and enabling selective back and forth adjustment of the seat. In this instance, the mounting means comprise a pair of laterally spaced and longitudinally extending track assemblies located beneath and along the two sides of the seat. The single track assembly 10 which has been shown is located beneath the inboard side of the passenger side seat. The outboard track assembly is generally similar to the inboard assembly and thus a description of one will suffice for both.

As shown in FIG. 1, the track assembly 10 comprises a longitudinally extending upper track 11 whose forward and rear end portions are adapted to be anchored to the underside of the seat by studs 13 or other suitable fastening means. The upper track is supported to move back and forth along a longitudinally extending lower track 15 which is adapted to be fastened to the floor pan by front and rear studs 17, only the front stud being visible.

An elongated latching plate 19 is fastened rigidly to the lower track 15 and extends along one side of the track assembly 10. Several longitudinally spaced and laterally facing windows 21 are formed through the latching plate. A latch 23 is pivotally connected at 25 to a bracket 27 which is connected to and is carried by the upper track 11. When the latch is in its latched position shown in FIG. 1, two latching teeth 29 on the latch 23 project through adjacent windows 21 in the latch plate 19 and hold the upper track 11 against longitudinal movement relative to the lower track 15. By using an elongated handle 31 to swing the latch about the pivot 25, the teeth 29 may be retracted out of the windows 21 to permit adjustment of the upper track and the seat. A contractile spring 33 normally holds the latch in its latched position.

In the case of the inboard track assembly 10 which has been shown, an extension 35 (FIG. 1) projects laterally and upwardly from the latch bracket 29. A horizontal pin 37 is supported by the extension and serves as an anchor for the fixed or stationary belt 39 of the vehicle safety belt system. The belt carries a socket 41 on its upper end for receiving a tongue (not shown) on the extendible/retractable belt of the safety belt system. With this arrangement, the stationary belt 39 adjusts forwardly and rearwardly in unison with the seat to avoid the need of the passenger adjusting the length of the extendible/retractable belt when the seat is adjusted. Because the belt is anchored to the track assembly 10, however, additional load is imposed on the track assembly via the belt and the bracket 27 when the vehicle is involved in a frontal crash, the load tending to cause the upper track 11 and the seat to move upwardly and forwardly relative to the lower track 15. It is necessary to restrain such movement in order to reduce the danger of serious injury to the passenger.

In accordance with one aspect of the present invention, the upper and lower tracks 11 and 15 are uniquely constructed so as to interlock with one another when a heavy upward force is imposed on the upper track. As a result of the interlocking, the upper track is less likely to move upwardly and forwardly relative to the lower track under a severe impact condition.

Figure 5:
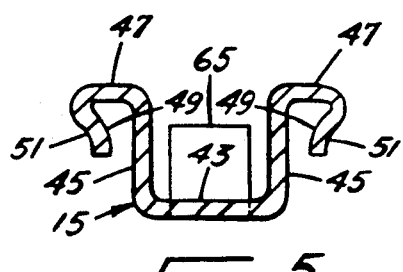
FIG. 5 is a transverse cross-sectional view of the lower track of the track assembly shown in FIG. 3.

More specifically, the lower track 15 (FIG. 5) is made of sheet metal and, in transverse cross-section, defines a generally U-shaped channel. Thus, the lower track includes a generally horizontal bottom wall 43 and further includes a pair of laterally spaced side walls 45 formed integrally with and projecting upwardly from the side margins of the bottom wall. A generally horizontal flange 47 is formed integrally with and extends laterally outwardly from the upper margin of each side wall. Formed integrally with and depending from the outer margin of each flange is a skirt 49. Each skirt is spaced laterally outwardly from the adjacent side wall 45 and is inclined so as to slope inwardly toward the side wall as the skirt progresses downwardly, the lower edge of the skirt being located about midway along the height of the side wall. In keeping with the invention, each skirt is bent into a curved configuration such that its outer side defines a concave and generally arcuate ball race indicated at 51.

The upper track 11 (FIG. 4) also is made of sheet metal and also is shaped generally as a channel but is oriented so as to define an inverted U. The upper track includes a generally horizontal top wall 53 spaced above the flanges 47 of the lower track 11 (see FIG. 3). Generally vertical side walls 55 are formed integrally with and depend from the side margins of the top wall 53. The side walls 55 extend downwardly beyond the skirts 49 in laterally outwardly spaced relation with the skirts. A flange 57 is formed integrally with and extends laterally inwardly from each side wall 55 of the upper track and is spaced downwardly from the lower edge of the adjacent skirt 49. The junction or corner 59 between each flange 57 and the adjacent side wall 55 is radiused.

Figure 4:
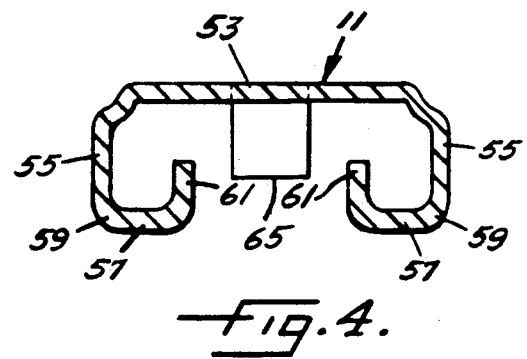
FIG. 4 is a transverse cross-sectional view of the upper track of the track assembly shown in FIG. 3.

The upper track 11 is completed by vertically extending lips 61 (FIG. 4) formed integrally with the inner margins of the flanges 57. When the two tracks 11 and 15 are in assembled relationship as shown in FIG. 3, each lip 61 projects upwardly into the space between the adjacent side wall 45 and skirt 49 of the lower track 15, the upper edge of the lip being spaced below the overlying flange 47. The lip normally is spaced from the side wall 45 and the skirt 49 so as to avoid rubbing against those elements when the upper track 11 is adjusted relative to the lower track 15.

To enable the upper track 11 to move back and forth relative to the lower track 15 with relatively low friction, two cylindrical rollers 63 (FIG. 2) are interposed between the tracks. Each roller engages and is pushed downwardly by the top wall 53 of the upper track 11 and pushes downwardly on the bottom wall 43 of the lower track 15. The rollers transmit the load of the seat from the upper track to the lower track. To keep the two rollers in longitudinally spaced relation with one another, lugs 65 are struck upwardly from the bottom wall 43 of the lower track 15 and are struck downwardly from the top wall 53 of the upper track 11. The lugs define compartments for the two rollers and limit travel of each roller to a predetermined range longitudinally of the track assembly 10.

Figure 6:
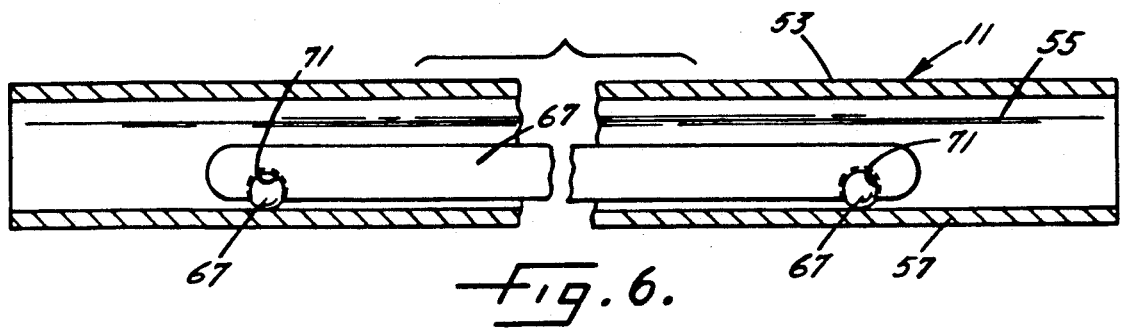
FIG. 6 is a cross-section taken substantially along the line 6—6 of FIG. 3.

In carrying out the invention, spherical balls 67 (FIGS. 2, 3 and 6) are located between each skirt 49 of the lower track 15 and the adjacent junction or corner 59 between the side wall 55 and the flange 57 of the upper track 11. The balls on each side of the track assembly 10 ride along the radiused corner 59 and also ride along the contoured ball race 51 formed on the outer side of the skirt 49. Herein, there are two balls 67 located in longitudinally spaced relation along each side of the track assembly 10. To maintain a fixed spatial relation between the two balls, provision is made of a retainer 69 (FIGS. 2 and 6) in the form of a narrow and elongated strip of relatively rigid plastic such as Delrin or the like. Each retainer is inserted between a skirt 49 and the adjacent side wall 55 and its end portions are formed with downwardly opening pockets 71 (FIG. 6) which capture the balls while permitting the balls to turn.

The balls 67 coact with the rollers 63 to enable the upper track 11 to be adjusted on the lower track 15 with relatively low friction. In addition, the balls 67 push downwardly against the flanges 57 of the upper track 11 and upwardly on the skirts 49 of the lower track 15 to take up vertical play between the two tracks and to prevent the upper track from lifting upwardly off of the lower track. Because the balls are located at the lower corners 59 of the upper track as in the case of prior track assemblies, the break-in, brinelling and wear characteristics of the balls are predictable factors. Because the balls and the rollers are separate and are not linked by a common retainer, the rollers turn freely and without binding in spite of tolerance variations in the tracks, the rollers and the balls.

Figure 7:
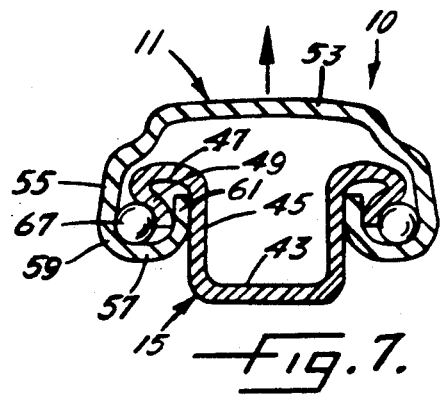
FIG. 7 is a view generally similar to FIG. 3 but shows the condition of the track assembly after the vehicle has been subjected to a severe frontal impact.

Importantly, the balls 67 effect interlocking of the two tracks 11 and 15 when the vehicle is subjected to a severe frontal crash. Under such conditions, the upwardly and forwardly directed force applied to the upper track 11 by the seat belt load causes the lower corners 59 of the upper track to push the balls upwardly as shown in FIG. 7. The balls are forced against the skirts 49 of the lower track 15 and bend the skirts inwardly against the lips 61 of the upper track 11. The lips, in turn, are forced against the side walls 45 of the lower track 15. In this way, the lips 61 of the upper track 11 are forcibly pinched between the skirts 49 and the side walls 45 of the lower track 15 so as to help prevent forward movement of the upper track along the lower track and also to prevent the upper track from separating vertically from the lower track. In an extreme crash, the upper edges of the lips 61 may be forced upwardly into engagement with the lower sides of the flanges 47 to provide yet greater resistance to forward movement of the upper track. Thus, the interlocking construction of the tracks 11 and 15 enables the track assembly 10 to carry greater loads and reduces the likelihood of the assembly failing under crash conditions.

We claim:

1. A track assembly for supporting the seat of a vehicle on the floor pan thereof, said assembly comprising a lower track adapted to be secured to the floor pan, an upper track adapted to be secured to the seat and adjustable back and forth along the lower track, said lower track being defined by an upwardly opening channel having a generally horizontal bottom wall and having laterally spaced side walls formed integrally with and extending upwardly from said bottom wall, a flange formed integrally with the upper end of each side wall and extending laterally outwardly from such side wall, a skirt formed integrally with and depending from the outer margin of each flange, each skirt being spaced laterally outwardly from the adjacent side wall and sloping toward the adjacent side wall upon progressing downwardly, the outer side of each skirt being contoured to define a ball race, said upper track being defined by a downwardly opening channel having a generally horizontal top wall spaced above said flanges and having laterally spaced side walls formed integrally with and extending downwardly from said top wall, said side walls of said upper track being spaced laterally outwardly from the skirts of said lower track, a flange formed integrally with the lower end of each side wall of said upper track and extending laterally inwardly beneath the adjacent skirt, a lip formed integrally with and extending upwardly from the inner margin of each flange of said upper track, each lip projecting upwardly along the inner side of the adjacent skirt and being located between the skirt and the adjacent side wall of the lower track and spherical balls spaced along each side of said track assembly, the balls along each side of said track assembly being positioned to ride along said ball race and also being positioned to ride along the junction between the side wall and the flange of the upper track.

2. A track assembly as defined in claim 1 in which said balls pinch said skirts against said lips and pinch said lips against the outer sides of the side walls of said lower track when a heavy upward force is imposed on said upper track as an incident to the vehicle being subjected to a severe frontal impact.

3. A track assembly as defined in claim 1 in which two balls are spaced along each side of said track assembly, and an elongated strip extending between each skirt and each adjacent side wall of said upper track and interconnecting the two balls on each side of said track assembly to hold said balls in fixed spaced relation.

4. A track assembly as defined in claim 3 in which each strip includes downwardly opening pockets for receiving said balls.

5. A track assembly as defined in claim 4 in which each strip is made of plastic.

6. A track assembly as defined in claim 1 further including cylindrical rollers interposed between and spaced along said tracks, said rollers bearing against the bottom wall of said lower track and the top wall of said upper track and traveling independently of said balls when said upper track is adjusted along said lower track.

7. A track assembly as defined in claim 6 further including means projecting upwardly from said bottom wall and downwardly from said top wall and limiting movement of each of said rollers to a predetermined range when said upper track is adjusted along said lower track.

8. A track assembly as defined in claim 3 further including cylindrical rollers interposed between and spaced along said tracks, said rollers bearing against the bottom wall of said lower track and the top wall of said upper track and traveling independently of said balls when said upper track is adjusted along said lower track.

9. A track assembly for supporting the seat of a vehicle on the floor pan thereof, said assembly comprising a lower track adapted to be secured to the floor pan, an upper track adapted to be secured to the seat and adjustable back and forth along the lower track, said lower track being defined by an upwardly opening channel having a generally horizontal bottom wall and having laterally spaced side walls formed integrally with and extending upwardly from said bottom wall, a flange formed integrally with the upper end of each side wall and extending laterally outwardly from such side wall, a skirt formed integrally with and depending from the outer margin of each flange, each skirt being spaced laterally outwardly from the adjacent side wall and sloping toward the adjacent side wall upon progressing downwardly, the outer side of each skirt being contoured to define a ball race, said upper track being defined by a downwardly opening channel having a generally horizontal top wall spaced above said flanges and having laterally spaced side walls formed integrally with and extending downwardly from said top wall, said side walls of said upper track being spaced laterally outwardly from the skirts of said lower track, a flange formed integrally with the lower end of each side wall of said upper track and extending laterally inwardly beneath the adjacent skirt, a lip formed integrally with and extending upwardly from the inner margin of each flange of said upper track, each lip projecting upwardly along the inner side of the adjacent skirt and being located between the skirt and the adjacent side wall of the lower track, spherical balls spaced along each side of said track assembly, the balls along each side of said track assembly being positioned to ride along said ball race and also being positioned to ride along the junction between the side wall and the flange of the upper track, an elongated strip extending between each skirt and each adjacent side wall of said upper track and interconnecting the balls on each side of said track assembly to hold said balls in fixed longitudinally spaced relation, and cylindrical rollers interposed between and spaced along said tracks, said rollers bearing against the bottom wall of said lower track and the top wall of said upper track and traveling independently of said balls when said upper track is adjusted along said lower track.

10. A track a assembly as defined in claim 9 further including means projecting upwardly from said bottom wall and downwardly from said top wall and limiting movement of each of said rollers to a predetermined range when said upper track is adjusted along said lower track.

11. A track assembly for supporting the seat of a vehicle on the floor pan thereof, said assembly comprising a lower track adapted to be secured to the floor pan, an upper track adapted to be secured to the seat and adjustable back and forth along the lower track, said lower track being defined by an upwardly opening channel having a generally horizontal bottom wall and having laterally spaced side walls formed integrally with and extending upwardly from said bottom wall, a flange formed integrally with the upper end of each side wall and extending laterally outwardly from such side wall, means on each flange defining a ball race. said upper track being defined by a downwardly opening channel having a generally horizontal top wall spaced above said flanges and having laterally spaced side walls formed integrally with and extending downwardly from said top wall, said side walls of said upper track being spaced laterally outwardly from the flanges of said lower track, a flange formed integrally with the lower end of each side wall of said upper track and extending laterally inwardly beneath the adjacent flange of the lower track, spherical balls spaced along each side of said track assembly, the balls along each side of said track assembly being positioned to ride along said ball race and also being positioned to ride along the junction between the side wall and the flange of the upper track, an elongated strip alongside each side wall of said upper track and interconnecting the balls on each side of said track assembly to hold said balls in fixed longitudinally spaced relation, and cylindrical rollers interposed between and spaced along said tracks, said rollers bearing against the bottom wall of said lower track and the top wall of said upper track and traveling independently of said balls and said strips when said upper track is adjusted along said lower track.

* * * * *